United States Patent [19]

Kassai

[11] 4,386,790
[45] Jun. 7, 1983

[54] BABY CARRIAGE

[75] Inventor: Kenzou Kassai, Osaka, Japan

[73] Assignee: Kassai Kabushikikaisha, Osaka, Japan

[21] Appl. No.: 239,420

[22] Filed: Mar. 2, 1981

[51] Int. Cl.³ .............................................. B62B 7/08
[52] U.S. Cl. ..................................... 280/650; 280/42; 280/642; 280/647; 297/45
[58] Field of Search ............... 280/650, 649, 648, 647, 280/42, 639, 642, 646; 297/45, DIG. 4

[56] References Cited

U.S. PATENT DOCUMENTS

| | | | |
|---|---|---|---|
| 4,111,454 | 9/1978 | Kassai | 280/649 |
| 4,191,397 | 3/1980 | Kassai | 280/647 |
| 4,216,974 | 8/1980 | Kassai | 280/42 |
| 4,232,897 | 11/1980 | MacLaren et al. | 280/647 X |
| 4,265,466 | 5/1981 | Kassai | 280/648 |
| 4,266,807 | 5/1981 | Griffin | 280/42 X |
| 4,272,100 | 6/1981 | Kassai | 280/650 |
| 4,317,581 | 3/1982 | Kassai | 280/42 |
| 4,362,315 | 12/1982 | Kassai | 280/650 |

Primary Examiner—Joseph F. Peters, Jr.
Assistant Examiner—Mitchell J. Hill
Attorney, Agent, or Firm—W. G. Fasse; D. H. Kane, Jr.

[57] ABSTRACT

A foldable baby carriage or infant carrier comprises a pair of slide guide rods, a pair of sliders slidable on the slide guide rods, a pair of front legs turnably connected at the upper end thereof to the sliders, a pair of rear legs turnably connected to the intermediate portions of the front legs, a pair of support angle bars turnably connected at one of their respective ends to the intermediate portions of the rear legs and at the other ends thereof to the lower ends of the slide guide rods, and a pair of foldable operative connecting rods which are turnably connected in such a manner as to connect the above-mentioned intermediate portions to the slide guide rods at positions spaced a predetermined distance from the lower ends thereof. During the folding operation, the various connecting portions turn while the sliders slide on the slide guide rods. In the folded state, the support angle bars overlap the slide guide rods, so that the overall height has been decreased.

21 Claims, 30 Drawing Figures

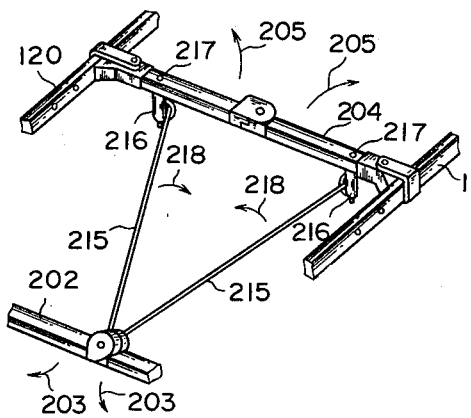
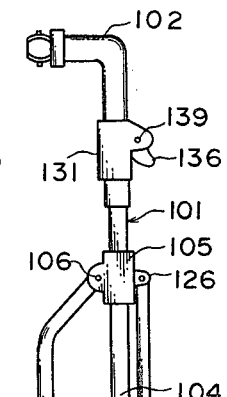
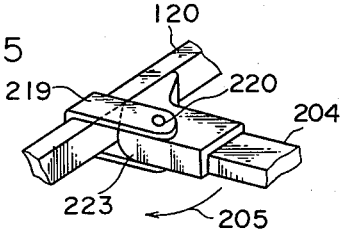
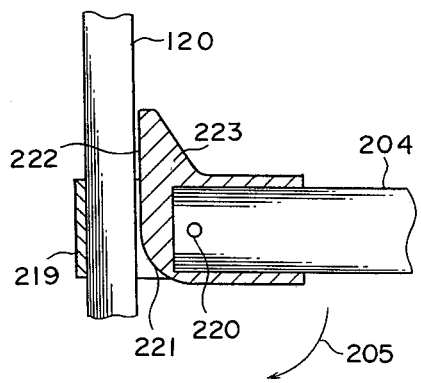
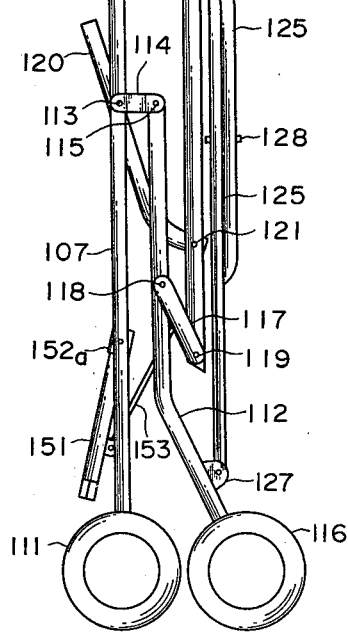

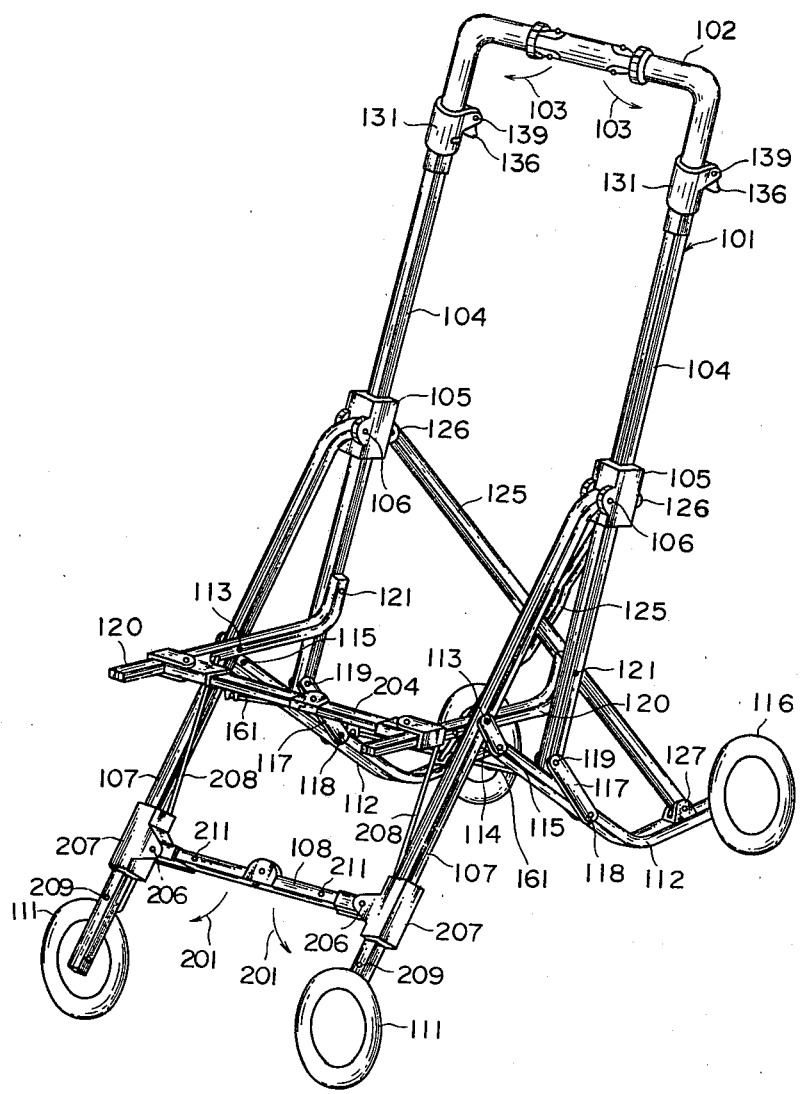

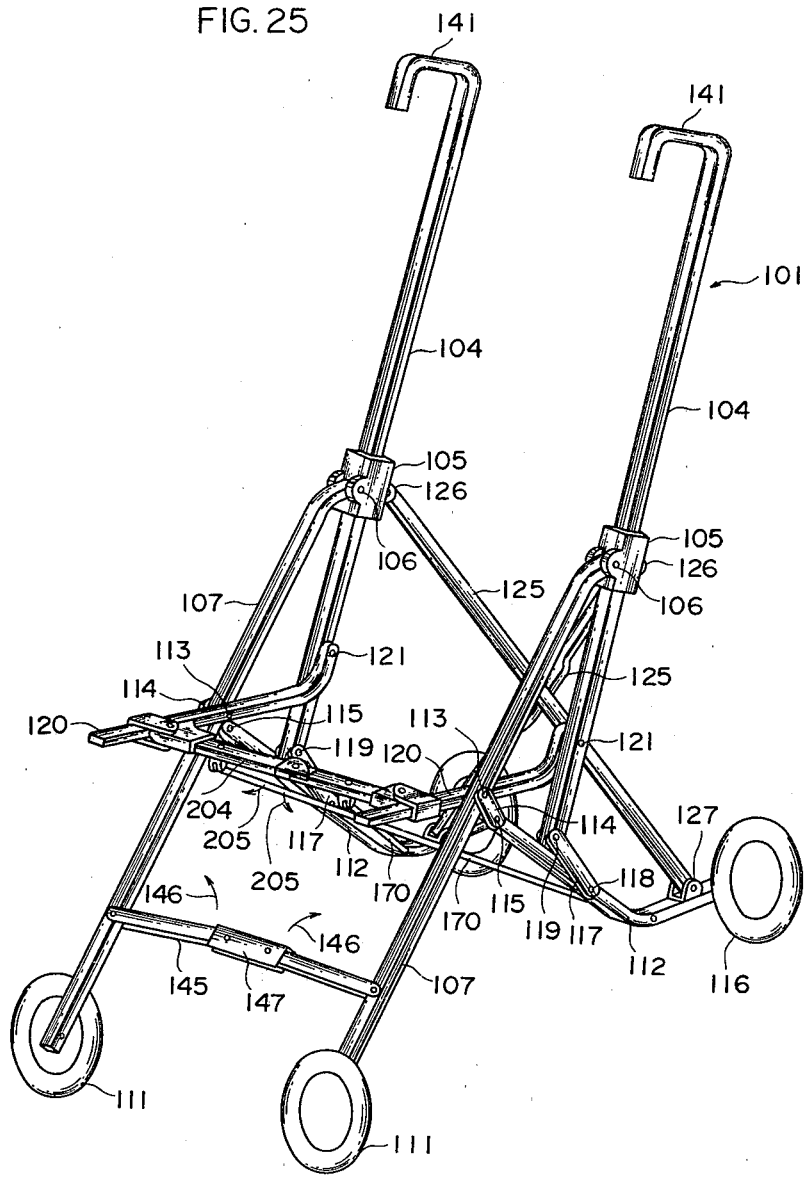

FIG. 30
FIG. 26
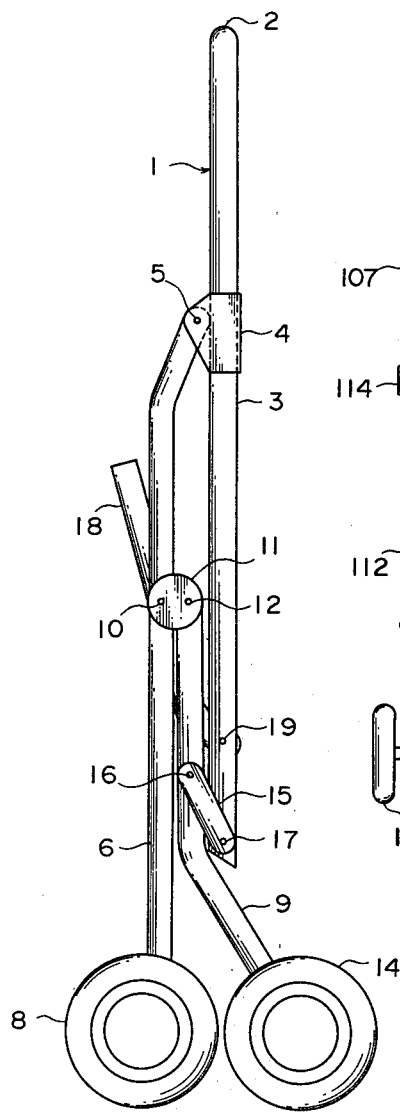
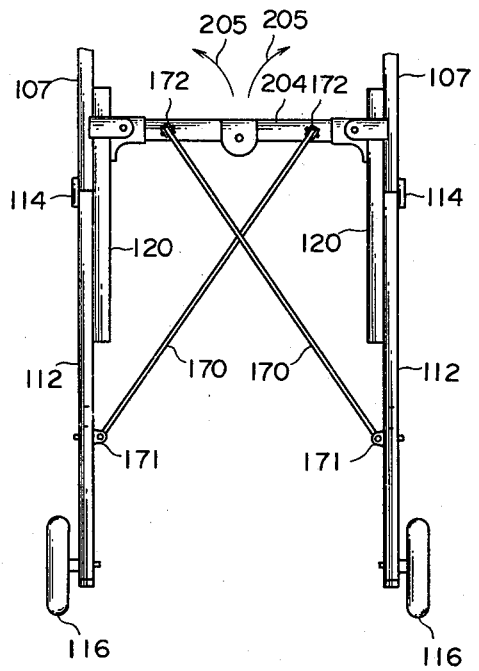

BABY CARRIAGE

BACKGROUND OF THE INVENTION

The present invention relates to a collapsible baby carriage or infant carrier, and more particularly it relates to improvements in a folding mechanism used in baby carriages.

Description of the Prior Art

Heretofore, a variety of basic baby carriage constructions have been proposed and put into practical use. Baby carriages of such proposed basic constructions include one having a chair type basic construction. A foldable version of such baby carriage of chair type basic construction has also been proposed.

However, such foldable baby carriage of chair type basic construction still has some points which remain to be improved. More particularly, such conventional type, when folded, is still bulky. Accordingly, it is desirable that in folded condition, it have a much smaller size, in terms of height, width and length. Further, such conventional type, when folded, has its four wheels, front and rear, not on a level with each other, so that it is impossible for the baby carriage to stand by itself when folded. Accordingly, it is desired that the baby carriage have a construction which enables it to stand by itself when folded. Further, such conventional type of baby carriage is not necessarily simple in folding operation. Accordingly, there is a desire for a baby carriage which is simple in folding operation, for example, to the extent that it can be folded by one hand.

Further referring to the configuration of the baby carriage in folded condition described above, where it is designed to be carried on the user's arm in folded condition, it is desired that it can be fully collapsed to assume a small bar form. It is also convenient that the user be able to walk while pulling the baby carriage in folded condition on rolling of the wheels. Further, such manner of conveyance requires that the baby carriage be sufficiently lightweight not to become a burden.

SUMMARY OF THE INVENTION

Briefly, the invention is directed to a foldable baby carriage comprising a pair of front legs having front wheels, a pair of rear legs having rear wheels, and a pusher member for manual push. The pusher member is formed with substantially vertically extending slide guide rods. A pair of sliders are provided on the slide guide rods so that they are slidable thereon. The front legs are pivotally connected, at the upper ends thereof, to the sliders. The rear legs are pivotally connected to the front legs in the intermediate portions thereof. The intermediate portions of the rear legs and the lower end of the pusher member are pivotally connected together by a pair of support angle bars or linkages. The support angle bars or linkages serve to decrease the height of the baby carriage when folded. The intermediate portions of the front legs are pivotally connected by a pair of folding operative connecting rods to the pusher member at positions spaced a predetermined distance from the lower end of the pusher member. The opposite lateral surfaces of the baby carriage are defined by said slide guide rods, front legs, rear legs, and operative connecting rods. The distance between said opposed lateral surfaces is defined by width defining means.

There are two forms of said width defining means; one which defines a fixed value of width and the other which defines two values of width. In the case of the latter form, the width of the baby carriage, when folded, is decreased. In preferred embodiments, this width defining means is variously modified and additional connecting means are used to effect the movement of the width defining means in a manner operatively associated with the folding movement of the baby carriage.

OBJECTS OF THE INVENTION

Accordingly, a principal object of the invention is to decrease the bulkiness of a foldable baby carriage of chair type basic construction when it is folded.

Another object of the invention is to provide a baby carriage which is easy to fold.

A further object of the invention is to provide a baby carriage whose folding movement is smooth.

These and other objects and features of the invention will become more apparent from the following detailed description to be given with reference to the accompanying drawings.

BRIEF FIGURE DESCRIPTION

In order that the invention may be clearly understood, it will now be described, by way of example, with reference to the accompanying drawings, wherein.

Figure 8:
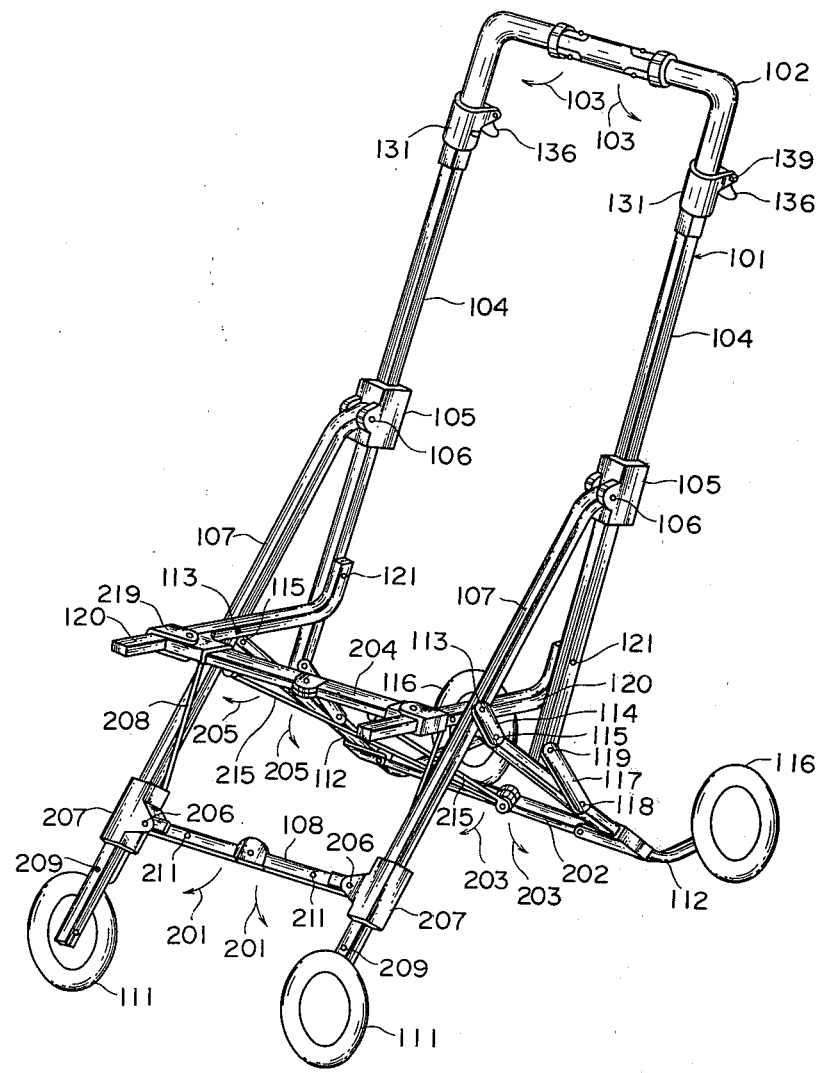
FIG. 8 is a perspective view, showing the opened state of a baby carriage according to a further embodiment of the invention.
Figure 11:
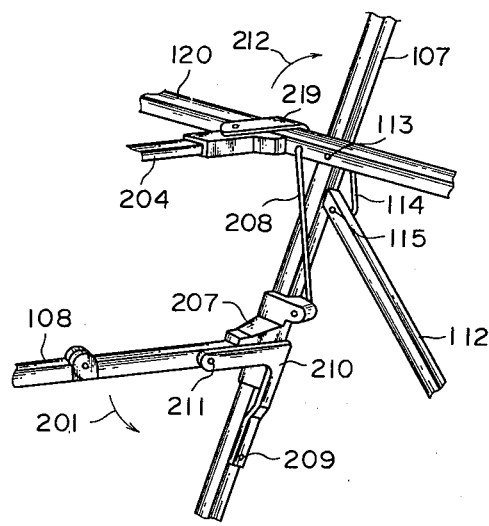
Figure 12:
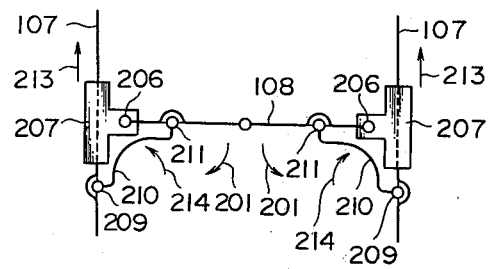
Figure 13:
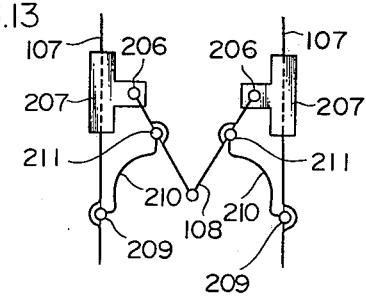
Figure 17:
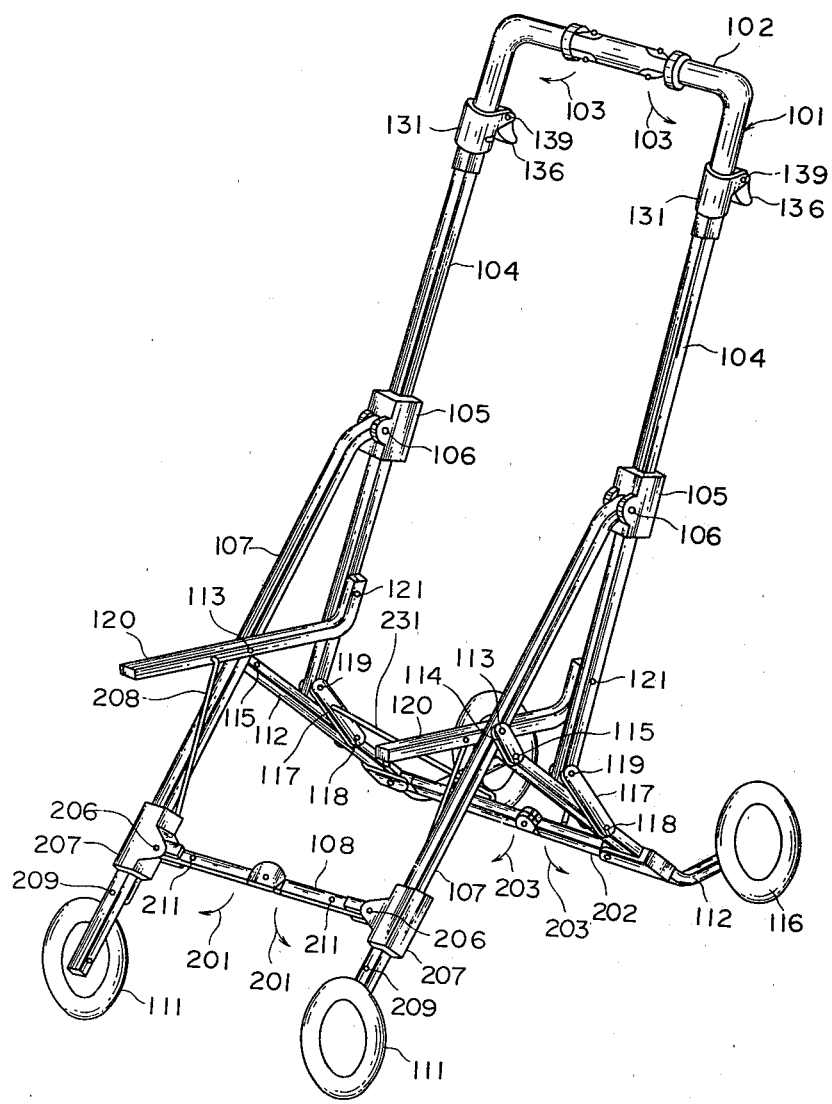
Figure 18:
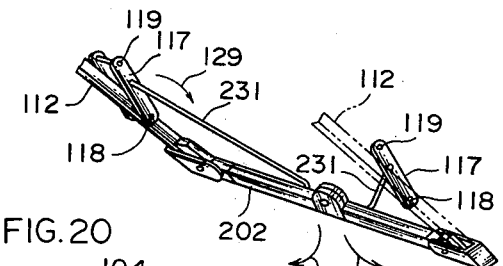
Figure 20:
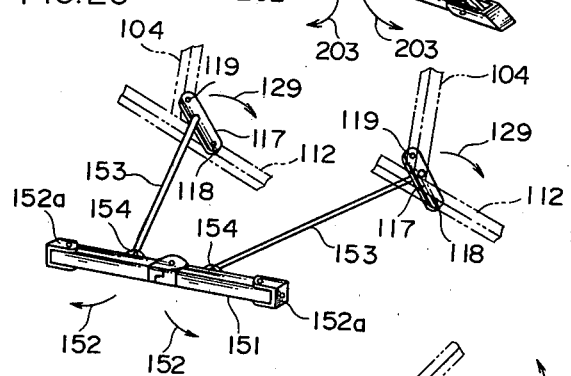
Figure 23:
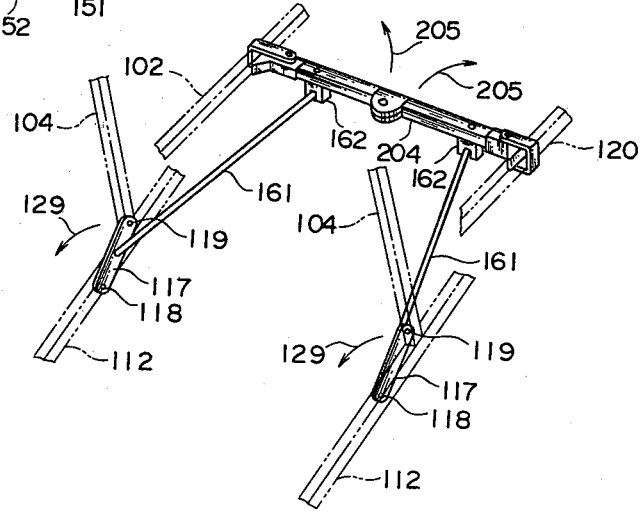
Figure 19:
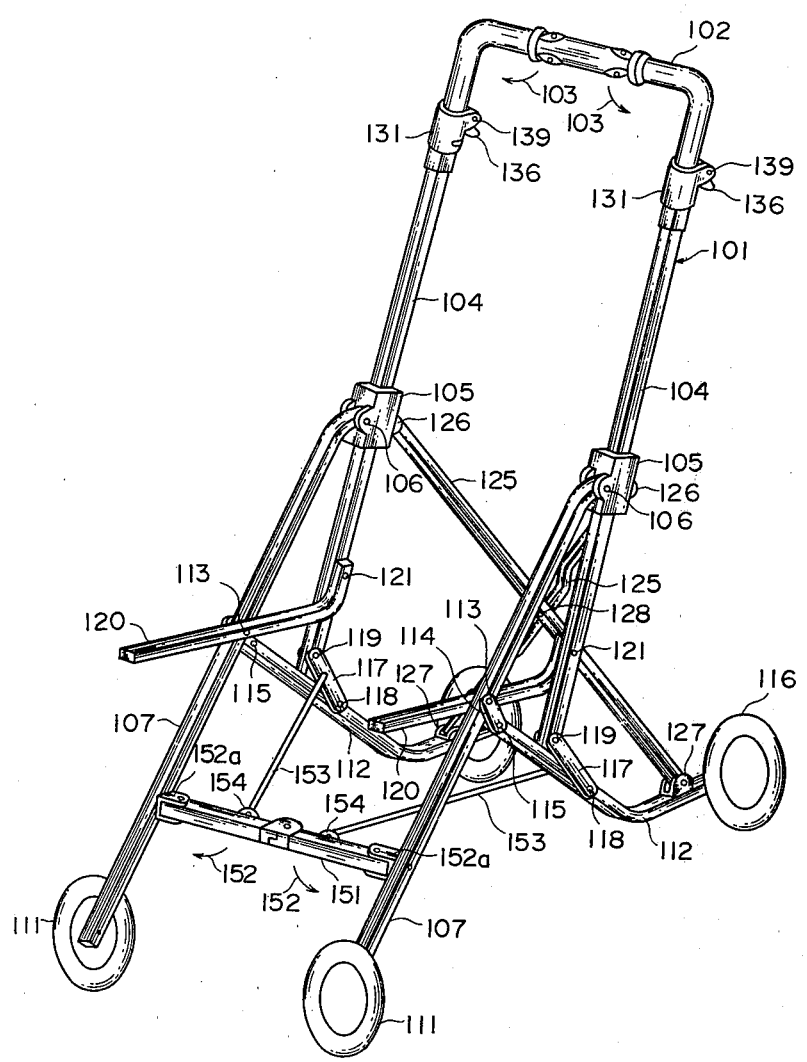
Figure 24:
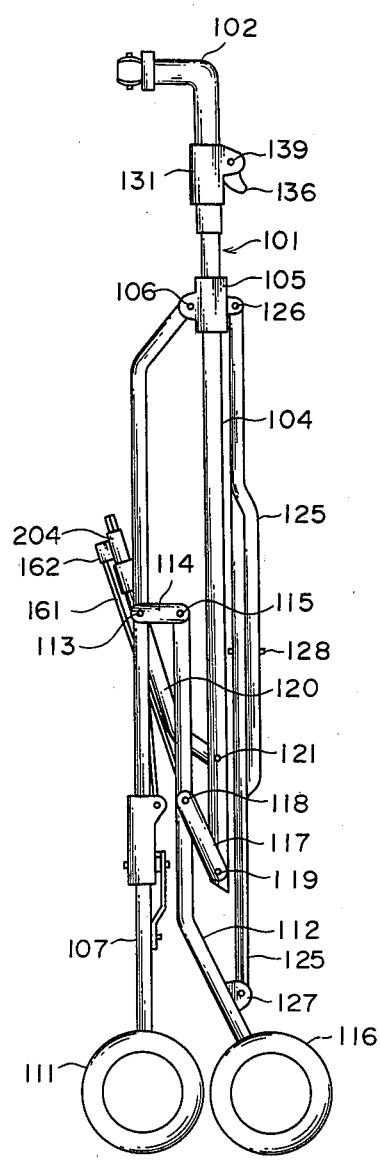
Figure 27:
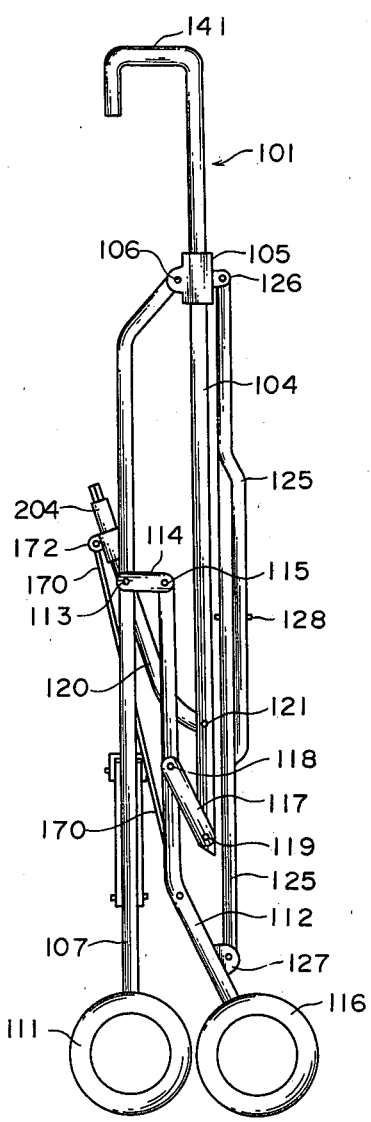
Figure 28:
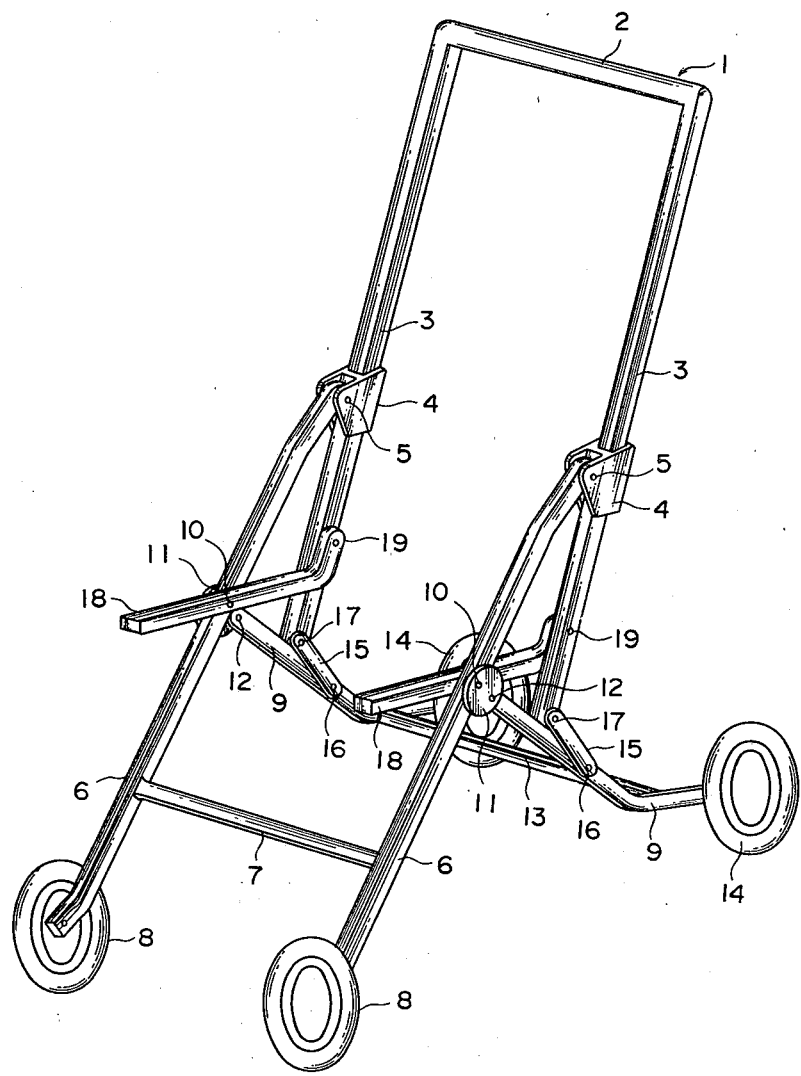
Figure 29:
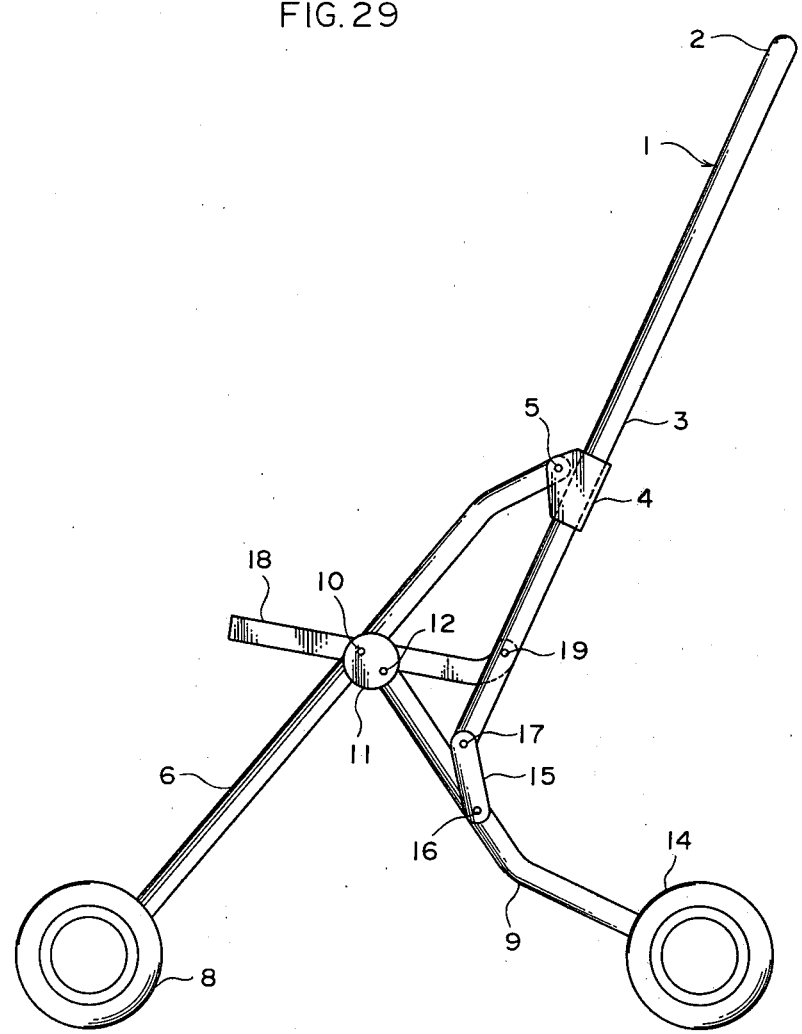

FIG. 11 is a perspective view, as seen from behind, of the operative connection between a front leg 107, a front leg connecting rod 108 and folding operative connecting rod 120 included in the baby carriage of FIG. 8;

FIGS. 12 and 13 are diagrammatic views, illustrating the operation of the portions shown in FIG. 11;

FIG. 14 is a perspective view, as seen from behind, of a rear leg connecting rod 202 and a central connecting rod 204 included in the baby carriage of FIG. 8;

FIG. 15 is a perspective view of the connection of the central connecting rod 204 to the folding operative connecting rod 120 of FIG. 14;

FIG. 16 is a plan view, partly in section, of the portion shown in FIG. 15;

FIG. 17 is a perspective view of another embodiment of the invention, shown in the opened state;

FIG. 18 is a perspective view of an operative connection, extracted from FIG. 17, between the rear leg connecting rod 202 and the support angle bars 117;

FIG. 19 is a perspective view of another embodiment of the invention, shown in the opened state;

FIG. 20 is a perspective view of an operative connection, extracted from the baby carriage of FIG. 19, between the front leg connecting rod 151 and the support angle bars 117;

FIG. 21 is a side view of the baby carriage of FIG. 19, in its closed state;

FIG. 22 is a perspective view of another embodiment of the invention, shown in the opened state;

FIG. 23 is a perspective view, as seen from behind, of an operative connection between the central connecting rod 204 and the support angle bars 117 of the baby carriage of FIG. 22;

FIG. 24 is a side view of the baby carriage, in its closed state;

FIG. 25 is a perspective view of another embodiment, shown in the opened state;

FIG. 26 is a view, a seen from below of an operative connection between the rear legs 112 and the central connecting rod 204 of the baby carriage of FIG. 25;

FIG. 27 is a side view of the baby carriage of FIG. 25, in its closed state;

FIG. 28 is a perspective view of another embodiment of the invention, shown in the opened state;

FIG. 29 is a side view of the baby carriage of FIG. 28; and

FIG. 30 is a side view of the baby carriage of FIG. 28 in its closed state.

DETAILED DESCRIPTION OF PREFERRED EXAMPLE EMBODIMENTS AND OF THE BEST MODE OF THE INVENTION

Figure 1:
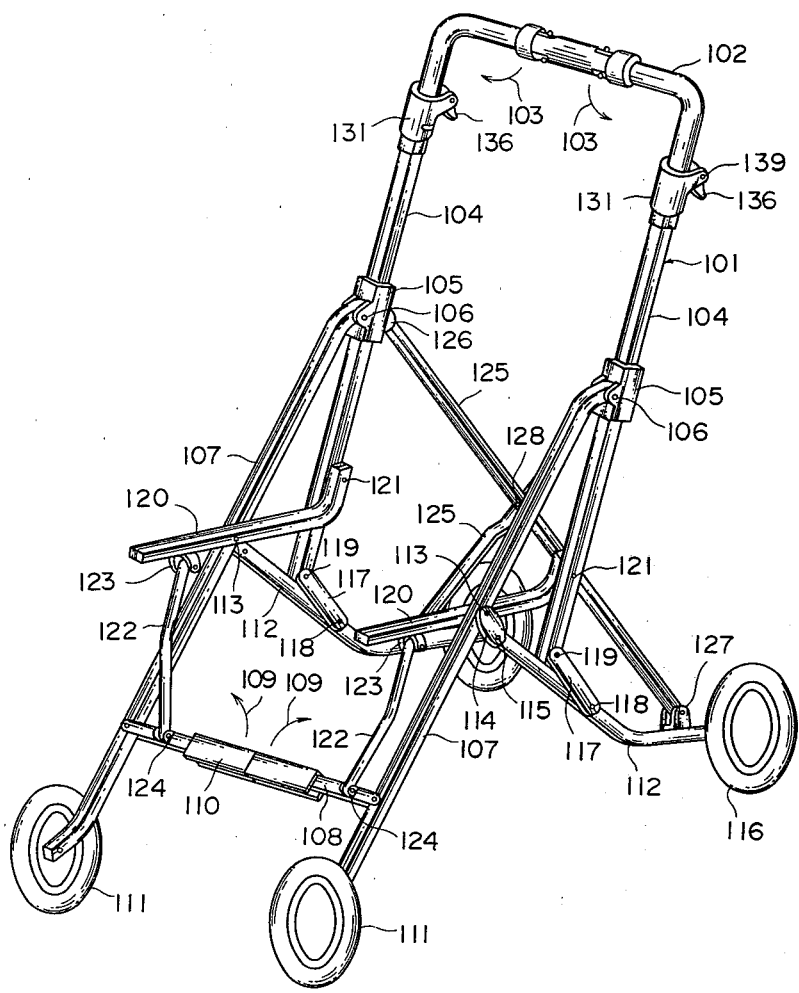
FIG. 1 is a perspective view of an embodiment of the invention, shown in the opened state.
Figure 2:
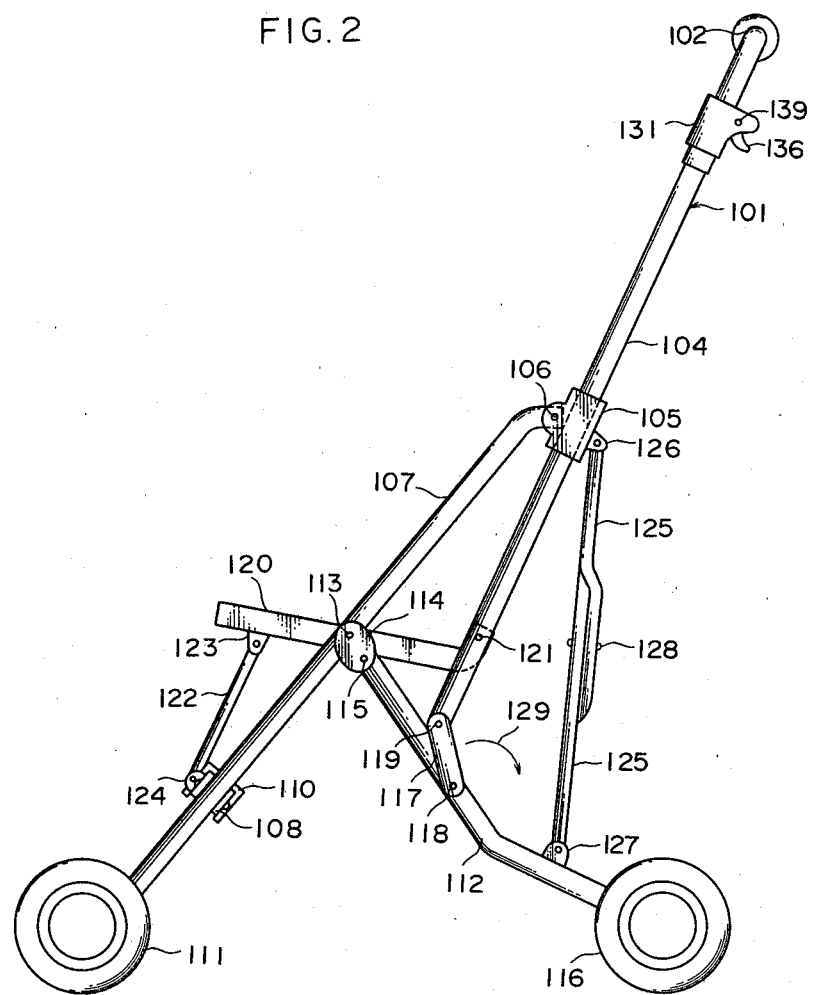
FIG. 2 is a side view of the baby carriage of FIG. 1.
Figure 3:
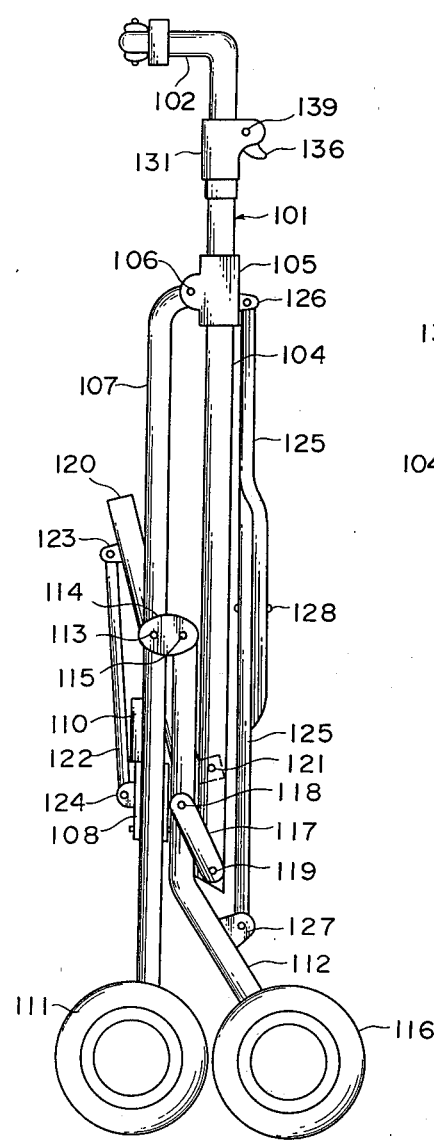
FIG. 3 is a side view of the baby carriage of FIG. 1 but shown in its closed state.

FIG. 1 a perspective view of an embodiment of this invention, shown in its opened state. FIG. 2 is a side view of the baby carriage of FIG. 1. FIG. 3 is a side view of the baby carriage of FIG. 1 but shown in its closed state.

Referring mainly to the figures showing the opened state, the arrangement of the baby carriage shown herein will be described. A pusher member 101 to be manually pushed by a person who handles the baby carriage an inverted U-shaped as a whole, with the upper portion thereof forming a grip portion 102. The grip portion 102 is foldable in the direction of arrows 103 shown in FIG. 1. The substantially vertically directed portions or pusher arms of the pusher member 101 form slide guide rods 104. Each slide guide rod or pusher arms 104 has a slider 105 slidably mounted thereon. The upper end of a front leg 107 is pivotally connected to each slider 105 by a pivot pin 106. As shown in the figures, each slider 105 is in the form of a sleeve formed around the respective slide or sleeve guide rod 104 for sliding motion along the generally vertical direction. The right and left front legs 107 are connected together by a front leg connecting rod 108 for the purpose of reinforcement. The front leg connecting rod 108 is foldable in the direction of arrows 109 shown in FIG. 1. By utilizing the front leg connecting rod 108, a foot rest 110 is attached thereto so that the feet of the baby placed in the baby carriage may be supported on the foot rest. The front legs 107 each have a rotatable front wheel 111 mounted on the lower end thereof. A rear leg 112 is turnably or pivotally connected to each front leg 107 at the intermediate portion thereof. In this embodiment, each rear leg 112 is pivotally connected to a connector 114 by a pivot pin 115, said connector being attached to the lateral surface of the front leg 107 by a pivot pin 113. Thus, each connector 114 is a double pivot linkage. Each rear leg 112 has a rear wheel 116 mounted on the lower end thereof. One end of a support angle bar 117 is turnably or pivotally connected to each rear leg 112 at the intermediate portion thereof by a pivot pin 118. The other ends of the support angle bars have the lower end of the pusher member 101 turnably or pivotally connected thereto by pivot pins 119. Thus, each support angle bar 117 is a double pivot linkage. As shown in FIG. 1, the double pivot linkage 117 is in the form of an elongate bar with pivot pin couplings at each end. The pivot pin 113, which attaches the connector 114 to the front leg 107 as described above, also pivotally connects a folding operative connecting rod 120 to the front leg. The rear ends of these folding operative connecting rods 120 are turnably connected to the pusher member 101 by pivot pins 121. Each folding operative connecting rod 120 has a portion which further forwardly extends from the region where it is connected to the front leg 107, and a prop 122 is connected between said portion and front leg connecting rod 108. The connections at the opposite ends of the prop 122 where the latter is connected to the folding operative connecting rod 120 and to the front leg connecting rod 108 are composed of universal joint-like connectors 123 and 124, respectively. Disposed on the back side of the baby carriage are cross rods 125 which cross each other in the form of the letter X. The cross rods 125, together with the front leg connecting rod 108 described above, serve to define the widthwise measured dimension of the baby carriage. The cross rods 125 are connected together at their upper ends to the sliders or sleeves 105 by means of universal joint-like connectors 126. The lower ends of the cross rods 125 are connected to relatively lower portions of the rear legs 112 disposed diametrically opposite to the respective associated sliders 105 by means of universal joint-like connectors 127. This results in the pair of cross rods 125 crossing each other in the form of the letter X, and the cross rods are then pivotally connected together by a pivot pin 128.

In the baby carriage of such basic construction, this embodiment is so arranged that the folding operation will commence and proceed when the grip portion 102 is folded in the direction of arrows 103. If, therefore, the folding of the grip portion 102 is inhibited, the opened state shown in FIGS. 1 and 2 will be maintained. Means for performing such operation will now be described.

Figure 4:
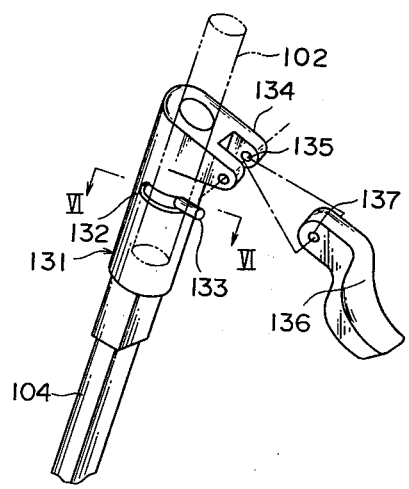
FIG. 4 is a fragmentary exploded perspective view showing the arrangement associated with an operating lever provided in connection with a pusher member shown in FIGS. 1 through 3.
Figure 5:
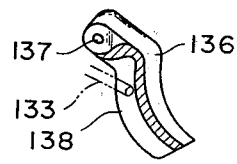
FIG. 5 is a perspective view, partly in section, of the operating lever of FIG. 4.
Figure 6:
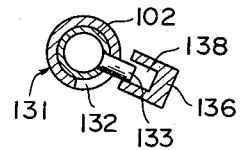
FIG. 6 is a section taken along the line VI—VI of FIG. 4.

FIG. 4 is a fragmentary exploded perspective view, showing an arrangement associated with an operating lever provided in connection with the pusher member shown in FIGS. 1 through 3. FIG. 5 is a perspective view, partly in section, of the operating lever of FIG. 4. FIG. 6 is a section taken along the line VI—VI of FIG. 4.

The upper ends of those portions of the pusher member 101 which correspond to the slide guide bars 104 are each formed with a guide socket 131. The slide guide rod 104, which is, e.g., square in cross section, is received in the slide socket 131 and fixed therein. The grip portion 102 is formed of a round pipe or bar and is turnable within the slide guide socket 131 around the axis thereof. The lateral surface of each guide socket 131 is formed with an elongated guide hole 132 extending through an angle of about 90 degrees, where a guide pin 133 fixed to the grip portion 102 is inserted. The guide socket 131 is formed with a bracket 134 which is formed with throughgoing holes 135. The operating lever 136 has a throughgoing hole 137. With the throughgoing holes 137 and 135 aligned with each other, a shaft 139 (FIGS. 1 through 3) is inserted, so that the operating lever 136 is supported turnably relative to the guide socket 131. The operating lever 136 is formed with a recess 138 on its downwardly directed surface. Therefore, when the operating lever 136 is turned downwardly, the guide pin 133 is received in the recess 138, as shown in FIGS. 5 and 6, whereby the grip portion 102 is inhibited from turning relative to the slide guide rod 104. On the other hand, when the operating lever 136 is turned upwardly, this frees the guide pin 133 from the recess 138 and allows said guide pin to move freely within the elongated guide hole 132, thus making the grip portion 102 ready for turning.

The operation and process of folding the baby carriage will now be described.

In the opened state of the baby carriage, the support angle bars 117 each have been turned to a relatively upper position with respect to the pivot pin 118 by which it is connected to the rear leg 112, thereby bringing the pusher member 101 to a relatively upper position. In this condition, the lower portion of the pusher member 101, the upper portion of the rear leg 112 and the rear portion of the folding operative connecting rod 120 cooperate with each other to form a triangle, thereby establishing the opened state of the baby carriage.

When it is desired to change the baby carriage from the opened state described above to its closed state, the operator turns the operating levers 136 upwardly so as to render the grip portion 102 foldable in the direction of arrows 103. Next, the operator holds the grip portion by one hand and tilts the entire baby carriage rearwardly so as to lift the front wheels 111 with the rear wheels 116 still held in contact with the ground. In response to this movement, the weight of the baby carriage acts advantageously, to facilitate folding the grip portion 102 in the direction of arrows 103 and turning the support angle bars 117 in the direction of arrow 129 (FIG. 2). When this turning of the support angle bars 117 takes place, the operator depresses the pusher member 101 with the rear wheels 116 still held in contact with the ground. In response thereto, relative sliding movement occurs between the sliders or sleeves 105 and the slide guide rods 104, with the pusher member 101 being brought to a lower position. In response thereto, the folding operative connecting rods 120 are tilted such that their front ends point upwardly, thus causing the props 122 to fold the front leg connecting rod 108 in the direction of arrows 109. In response to this folding of the front leg connecting rod 108, the pair of front legs 107 move toward each other. Almost simultaneously therewith and since relative slide between the sliders 105 and the slide guide rods 104 has already taken place as described above, the pair of cross rods 125 are turned to assume a vertically extending side-by-side position, whereby the pair of slide guide rods 104 and the pair of rear legs 112 are respectively actuated to move toward each other. Eventually, as shown in FIG. 3, the front legs 107 are disposed substantially parallel to the pusher member 101 and also the rear legs 112 are disposed substantially parallel to the pusher member 101, with the right and left members moving toward each other. In the FIG. 3 state, since the two front wheels 111 and the two rear wheels 116 are on the same level, the baby carriage is capable of standing by itself. Thus, as shown in FIG. 3, the structural elements of the carriage are folded together in generally parallel alignment vertically oriented over the wheel. The wheels come together to form a stable base or pedestal for the vertically oriented and folded assembly.

In order to change the baby carriage from the closed state to the opened state, the operator holds the grip portion 102 and lifts the entire baby carriage. In response thereto, the weight of the baby carriage comes to act such that the support angle bars 117 each turn downwardly around the axis of the pivot pin 119 at the lower end of the pusher member 101 and at the same time the folding operative connecting rods 120 turn to a substantially horizontal position in response to the downward slide of the sliders 105 along the slide guide rods 104. In response thereto, the pair of slide or sleeve guide rods 104 and the pair of rear legs 112 move away from each other, respectively. At the end of such movement, the opened state shown in FIGS. 1 and 2 is established. If the operating levers 136 are then turned downwardly, this opened state is maintained.

Figure 7:
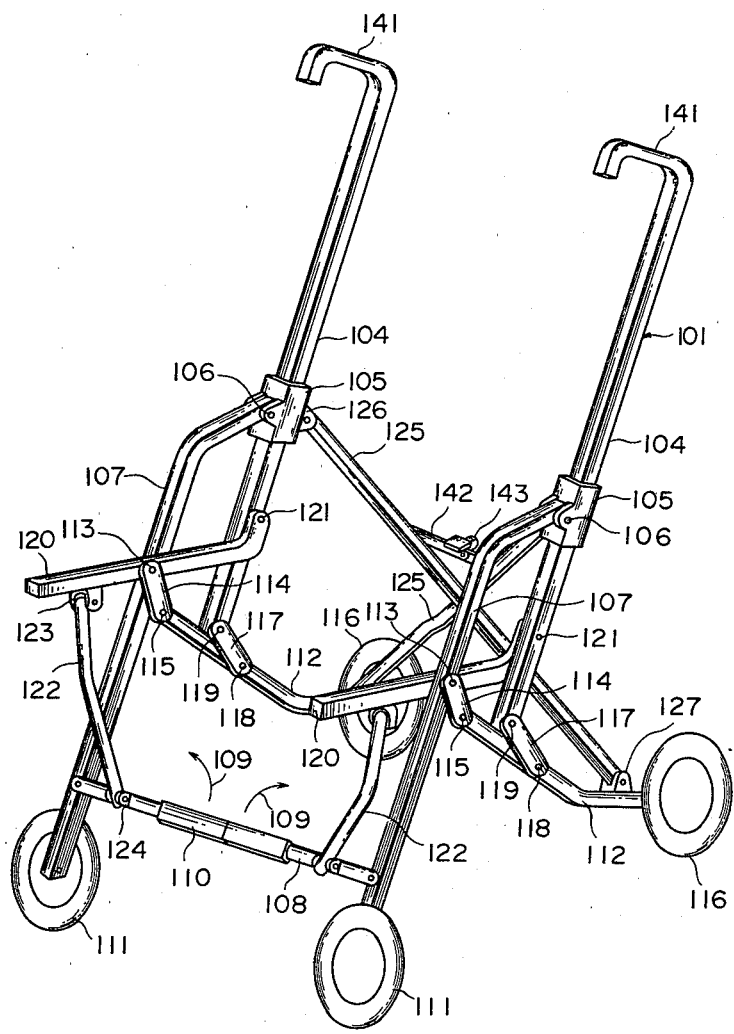
FIG. 7 is a perspective view, showing the opened state of a baby carriage according to another embodiment of the invention.

FIG. 7 is a perspective view, showing the opened state of a baby carriage according to another embodiment of the invention. In FIG. 7, the portions corresponding to those shown in the figures of the preceding embodiment are given like reference numerals and only the different arrangement will be described below.

The upper end of the pusher member 101 is not provided with a member which connects the right and left slide guide rods 104 and instead it is formed with separate grip portions 141. An operating rod 142 is provided adjacent the intersection of the pair of cross members 125. The operating rod 142 is pivotably connected to the two cross rods 125 and foldable only upwardly. The folding of the operating rod 142 is effected through a grip portion 143. The other constructions are basically the same as those of the preceding embodiment and a description thereof will be omitted.

In the embodiment shown in FIG. 7, as long as the operating lever 142 is kept straight, the opened state of the baby carriage will be maintained. In order to close the baby carriage, the operator holds the operating grip 143 by one hand and pulls it up. In response thereto, the operating rod 142 is folded upwardly to enable the pair of cross ends 125 to turn toward each other. The subsequent folding operation is the same as in the preceding embodiment and a description thereof will be omitted.

Figure 9:
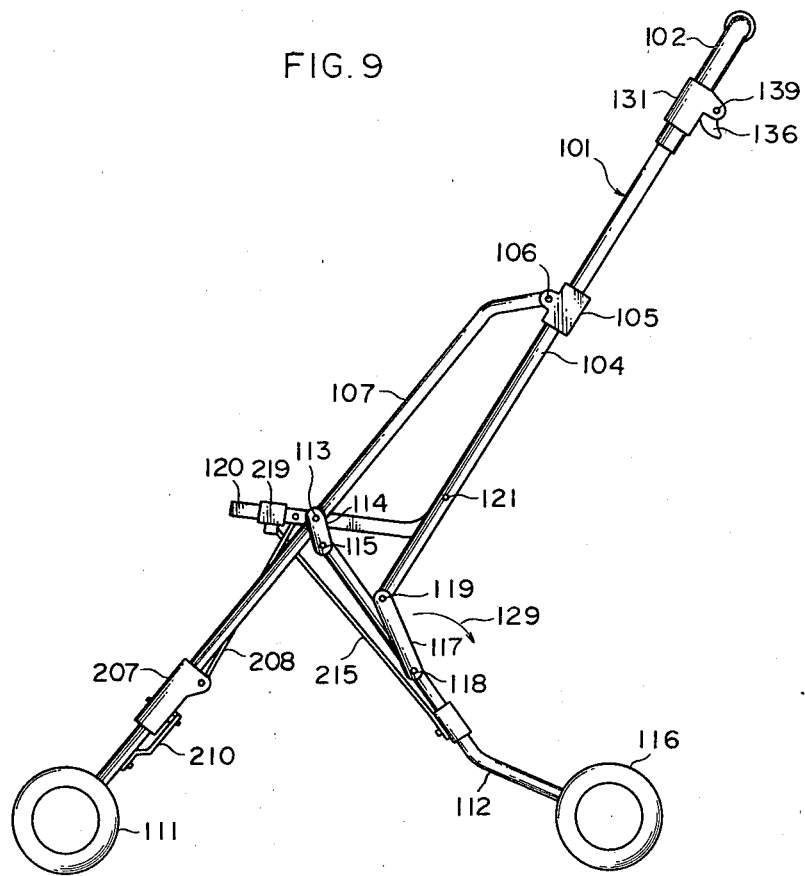
FIG. 9 is a side view of the baby carriage of FIG. 8.
Figure 10:
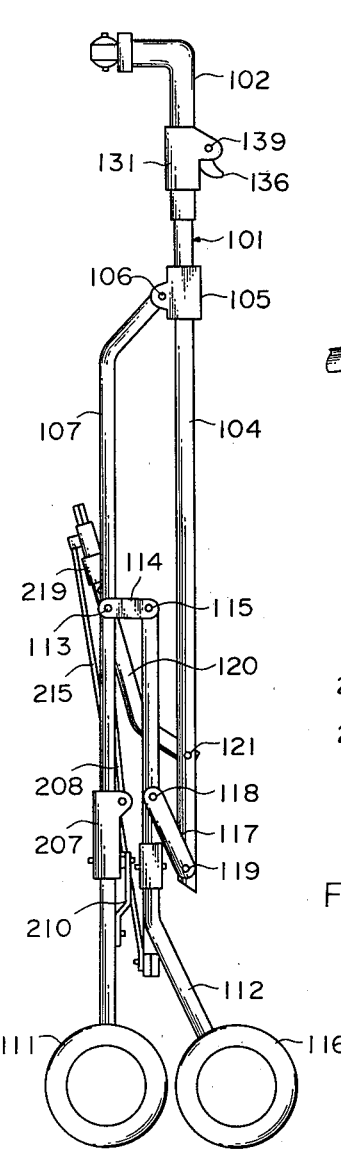
FIG. 10 is a side view of the baby carriage of FIG. 8 in its closed state.

FIG. 8 is a perspective view, showing the opened state of a baby carriage according to a further embodiment of the invention. FIG. 9 is a side view of the baby carriage of FIG. 8. FIG. 10 is a side view of the baby carriage in its closed state.

The baby carriage shown in these figures differs from the baby carriage of FIG. 1 described above in the following respects. The components corresponding to those included in the baby carriage of FIG. 1 are given like reference numerals.

The front leg connecting rod 108 is foldable in the direction of arrows 201 in FIG. 8. By utilizing the front leg connecting rod 108, a foot rest (not shown) is attached thereto, so that the feet of the baby placed in the baby carriage may be supported thereon. The rear legs 112 are connected together by a rear leg connecting rod 202 for the purpose of reinforcement. The rear leg connecting rod 202 is foldable in the direction of arrows 203 of FIG. 8. The folding operative connecting rods 120 each have a portion further extending forwardly from the region where the folding operative connecting rod is connected to the front leg 107. A central connecting rod 204 is connected between said extensions of the folding operative connecting rods 120. The central connection rod 204 is foldable in the direction of arrows 205 of FIG. 8 and defines also the carriage width in the unfolded condition. In addition, the baby carriage shown in FIGS. 8 through 10 does not have the pair of cross rods 125 shown in FIG. 1 and other components associated therewith.

Thus, the outlines of the characteristic construction of the baby carriage shown in FIGS. 8 through 10 have been described. Next, with reference to FIGS. 11 through 16 together with FIGS. 8 through 10, each portion of characteristic construction will be described in detail.

FIG. 11 is a perspective view, as seen from behind, of the operative connection of the front leg 107, front leg connection rod 108 and folding operative connecting rod 120. FIGS. 12 and 13 are diagrammatic views, illustrating the operation of the portions shown in FIG. 11. Each end of the front leg connecting rod 108 is pivotably connected to a second slider or sleeve 207 by a pivot pin 206. Each second slider or sleeve 207 includes a portion of inverted U-shaped cross-section which surrounds the associated end of the front leg connecting rod 108 from above, thereby rendering the front leg connecting rod 108 foldable only in the direction of arrows 201. The second slider 207 is slidably installed on the lower portion of the front leg 107. A bar link 208 is connected between the second slider 207 and said forward extension of the folding operative connecting rod 120. An L-shaped arm 210 extends inwardly from the front leg 107 and is pivotally supported by a pivot pin 209. The front leg connecting rod 108 is pivotably supported by pivot pins 211 each disposed at the front end of the arm 210 and spaced a predetermined distance from the associated end of the front leg connecting rod 108.

If the folding operative connecting rods 120 are turned around the axes of the pivot pins 113 in the direction of arrow 212, the second sliders 207 slide on the front legs 107 in the direction of arrow 213 through the bar links 208. In response thereto, the arms 210 are turned in the direction of arrow 214, while the front leg connecting rod 108 is turned around the axes of pivot pins 211 in the direction of arrows 201, so that the front leg connecting rod 108 is folded downwardly (FIG. 13).

The reverse movement from the state of FIG. 13 in which the front leg connecting rod 108 has been folded is achieved by the turning of the folding operative connecting rods 120 in the reverse direction to cause the bar links 208 to depress the second sliders 207. By this force, in the FIG. 13 state, the front leg connecting rod 108 is turned to extend straight and the arms 210 are slightly turned downwardly, thereby establishing the state shown in FIG. 12.

With the baby carriage in the opened state, when a force which turns the folding operative connecting rods 120 in a direction opposite to the direction of arrow 212 (which force is exerted by loads including the weight of the baby acting on the baby carriage because of the construction of the baby carriage) is exerted, the second sliders 207 are forced downwardly (opposite to the direction of arrow 213), which results in downwardly forcing the lower portions of the front leg connecting rod 108 received in the second sliders 207, so that the front leg connecting rod 108 is forced to be folded upwardly and is inhibited from turning in the direction of arrows 201. That is, the more the load acts on the baby carriage, the more firmly the opened state of the baby carriage is maintained.

FIG. 14 is a perspective view, as seen from behind, of the operative connection of the rear leg connecting rod 202 and central connecting rod 204.

The central connecting rod 204 is disposed at a position different in level from that of the rear leg connecting rod 202. A pair of tie rods 215 are provided so that in this condition the folding of the central connecting rod 204 in the direction of arrows 205 at the intermediate portion thereof may be operatively associated with the folding of the rear leg connecting rod 202 in the direction of arrows 203 at the intermediate portion of connecting rod 202. The tie rods 215 are connected between the foldable joint of the rear leg connecting rod 202 and positions which are spaced apart a predetermined distance from the foldable joint of the central connecting rod 204 on opposite sides thereof. The central connecting rod 204 is provided with connectors 216 for connecting the tie rods 215 thereto. The connectors 216 are each turnable around the axis of a shaft 217.

The rear leg connecting rod 202 and the central connecting rod 204 are adapted to move toward each other during the closing of the baby carriage, as will be later described. In connection with this movement toward each other, the movement of the operative connection shown in FIG. 14 will now be described. When the rear leg connecting rod 202 and the central connecting rod 204 move toward each other, the propping action of the tie rods 215 causes the folding of the rear leg connecting rod 202 in the direction of arrows 203 and the folding of the central rod 204 in the direction of arrows 205 to take place. Simultaneously therewith, the associated members which are disposed in pairs on the opposite sides, such as the folding operative connecting rods 120, move toward each other. Further, in response to the folding of the central connecting rod 204, the tie rods 215 each turn in the direction of arrow 218. This turning movement of the tie rods 215 in the direction of arrow 218 acts to increase the height of a triangle with two sides defined by the pair of tie rods 215 and the base defined by a line segment connecting the pair of shafts 217, so that this also contributes to the folding of the two connecting rods 202 and 204. That is, the degree of folding of the two connecting rods 202 and 204 can be increased, which means that the widthwise measured dimension of the baby carriage in its closed state can be correspondingly decreased. In addition, the reverse of the movement described above is likewise operatively associated with the action of the tie rods 215.

FIG. 15 is a perspective view showing the connection of the central connecting rod 204 to the folding operative connecting rod 120. FIG. 16 is a plan view, partly in section, of the connection shown in FIG. 15. The central connecting rod 204 is turnably pivotably connected by pivot pin 220 to a U-shaped connector 219 fixed to the folding operative connecting rod 120. Each end of the central connecting rod 204 is provided with rotation stop 223 having a surface 222 extending from a peripheral surface 221 at right angles with the direction in which the central connecting rod 204 extends, whereby the central connecting rod 204 is made turnable only in the direction of arrows 205, as already described.

An arrangement similar to that shown in FIGS. 15 and 16 is applied to the connections of the rear leg connecting rod 202 to the rear legs 112, though not particularly shown.

The operation and process of folding the baby carriage shown in FIGS. 8 through 10 are basically the same as in the baby carriage shown in FIG. 1. Therefore, in order to avoid a repetition of the description, only the characteristic features of the folding operation or process will be selectively described.

In the course from the opened state to the closed state, when the folding operative connecting rod 120 is turned in the direction of arrow 212 (FIG. 11) with its front end directed upwardly, the front leg connecting rod 108 is folded in the direction of arrows 201 according to the movement described with reference to FIGS. 11 through 13. In response thereto, the pair of front legs 107 move toward each other. Further, almost simultaneously therewith, movement of the pair of front legs 107 and the pair of slide guide rods or pusher arms 104 toward each other, respectively, and movement of the rear legs 112 toward the front legs 107 take place. Thereby, movement of the rear leg connecting rod 202 and the central connecting rod 204 toward each other takes place. In response thereto, the movement described with reference to FIG. 14 proceeds, so that the rear leg connecting rod 202 and the central connecting rod 204 are folded in the direction of arrows 203 and 205, respectively. Finally, as shown in FIG. 10, the front legs 107 extend substantially parallel to the vertically oriented pusher arms 104 of pusher member 101 and the rear legs 112 also extend substantially parallel to the pusher arms 104 of pusher member 101, with the right and left members moving toward each other. The entire assembly of generally parallel elements is therefore vertically oriented over the adjacent wheels 111 and 116 which form a base for the collapsed carriage.

In the course from the closed state to the opened state, the folding operative connecting rods 120 turn to a substantially horizontal position. In response thereto, the rear legs 112 turn away from the front legs 107, and by the action of the tie rods 215, the rear leg connecting rod 202 and the central connecting rod 204 are straightened in operatively associated relation. Because of this movement, the pair of slide guide rods 104, the pair of rear legs 112 and the pair of folding operative connecting rods 120 are widthwise moved away from each other, respectively. At the end of such movement, the opened state shown in FIGS. 8 and 9 is established.

FIG. 17 is a perspective view of yet another embodiment of the invention, shown in the opened state. The baby carriage shown in FIG. 17 is similar in basic construction to the baby carriage of FIG. 8. What apparently greatly differs is that the baby carriage of FIG. 17 is not provided with the central connecting rod 204 of FIG. 8. Therefore, the place where each end of the members corresponding to the pair of the rods 215 of FIG. 8 is connected is changed. The details thereof are shown in FIG. 18. FIG. 18 is a perspective view wherein the operative connection between the rear leg connecting rod and the support angle bars are extracted from the entire baby carriage of FIG. 17 for separate explanation and clarity. In addition, in FIGS. 17 and 18, the components corresponding to those included in FIG. 8 are given like reference numerals.

Referring to FIGS. 17 and 18, the support angle bars 117 and rear leg connecting rod 202 are connected together by rods 231. The rods 231 are pivotably connected, each at one end thereof, to the respectively associated support angle bars substantially in their intermediate portions. The other ends of the rods 231 are pivotably connected to the rear leg connecting rod 202 at positions spaced a predetermined distance from the middle of the rear leg connecting rod 202 on opposite sides of the latter.

In the arrangement described above, when the support angle bars or double pivot linkage bars 117 are turned each around the axis of pivot pin 118 in the direction of arrow 129, the rods 231 depress the rear leg connecting rod 202 to fold the latter in the direction of arrows 203. According to this operative connection, it is possible, when the baby carriage is to be opened and closed as well, to straighten or fold the rear leg connecting rod 202 through the rods 231, in operative association with the turning of the support angle bars 117.

FIG. 19 is a perspective view of another embodiment of the invention, shown in the opened state. FIG. 20 is a perspective view wherein the operative connection, which is characteristic of this embodiment, between the front leg connecting rod and the support angle bars is extracted for separate showing from the entire baby carriage of FIG. 19. FIG. 21 is a side view of the baby carriage of FIG. 19, in its closed state.

The embodiment to be described with reference to FIG. 19, etc. is similar to the baby carriage of FIG. 1 described above. Therefore, the components corresponding to those included in the baby carriage of FIG. 1 are given like reference numerals. Only the arrangement which differs from the baby carriage of FIG. 1 will be described.

A front leg connecting rod 151 extending between the right and left front legs 107 is provided for the purpose of reinforcement. The front leg connecting rod 151 is disposed in a relatively lower portion of the front legs 107 and is foldable at the middle forwardly as indicated by arrows 152 in FIG. 19. The front leg connecting rod 151 is pivotally connected at its opposite ends to the front legs 107, and the connectors 152a used therefor are preferably of the universal joint type. To provide for folding of the front leg connecting rod 151, rods 153 are provided in the place of the props 122 used in the baby carriage of FIG. 1.

Referring to FIG. 20, the support angle bars or double pivot linkage bars 117 and the front leg connecting rod 151 are connected together by the rods 153. The rods 153 are turnably connected, each at one end thereof, to the support angle bars or double pivot linkage bars 117 substantially in the intermediate portions thereof. The other ends of the rods 153 are pivotally connected to the front leg connecting rod 151 at positions spaced a predetermined distance from the middle of the front leg connecting rod 151 on opposite sides thereof. Connectors 154, preferably of the universal joint type, are applied to the connections between the rods 153 and the front leg connecting rod 151.

In the arrangement described above, when the support angle bars 117 are turned, each around the axis of a pivot pin 118 in the direction of arrows 129, it is seen that in the final stage of the turning, the rods 153 forwardly push the front leg connecting rod 151 to fold the latter in the direction of arrows 152.

Only the characteristic movements produced during the folding of the baby carriage shown in FIG. 19, etc. will be picked up and described below.

In the course from the opened state to the closed state, the support angle or double pivot linkage bars 117 are turned in the direction of arrows 129. The turning of the support angle or double pivot linkage bars 117 in the direction of arrows 129 appears, in its early stage, as a movement which causes the rear legs 112 to move toward the front legs 107. This is because the support angle or double pivot linkage bars 117 are connected to the front leg connecting rod 151, and the front leg connecting rod 151 cannot be folded backwardly, by the rods 153. Further turning of the support angle or double pivot linkage bars 117, after the movement of the rear legs 112 toward the front legs 107 almost comes to an end, causes the rods 153 to push the front leg connecting rod 151, acting to fold the latter in the direction of arrows 152. Finally, as shown in FIG. 21, the front leg connecting rod 151 is folded by rods 153 to project toward lower left while the front legs are arranged substantially parallel to the pusher member 101 and the rear legs 112 are arranged substantially parallel to the pusher member 101, with the right and left members moving toward each other. The carriage is again collapsed into a vertically oriented assembly of generally parallel elements in stable position over the wheels as shown in FIG. 21. The wheels of course come together to form a stable base or pedestal for the vertical assembly.

In the course from the closed state to the opened state, the support angle or double pivot linkage bars 117 are turned downwardly, each around the axis of the pivot pin 119, at the lower ends of the pusher member bodies 104. Further, the rear legs 112 are turned away from the front legs 107 and the front leg connecting rod 151 is drawn toward the same by the rods 153. Thereby, the front leg connecting rod 151 is actuated to extend in a line. At the end of such movement, the opened state shown in FIG. 19 is established.

FIG. 22 is a perspective view of another embodiment of the invention. FIG. 23 is a perspective view, as seen from behind, of the operative connection, characteristic of the FIG. 22 embodiment, between the central connecting rod 204 and the support angle bars 117, the view being taken from behind said operative connection. FIG. 24 is a side view of the baby carriage of FIG. 22.

The baby carriage shown in FIGS. 22 through 24 includes components included either in the baby carriage of FIG. 1 or in the baby carriage of FIG. 8. The components included in the baby carriage 1 of FIG. 1 or FIG. 8 are given like reference numerals.

In addition to the components common with the baby carriages of FIGS. 1 and 8, the baby carriage of FIG. 22 has the following basic arrangement: it includes the cross rods 125 shown in FIG. 1, the front leg connecting rod 108 and central connecting rod 204 of FIG. 8, and the elements associated therewith. What is characteristic of this embodiment is the arrangement shown in FIG. 23.

Referring to FIG. 23, the central connecting rod 204 is foldable at the middle thereof as shown in FIG. 23 substantially forwardly, i.e., in the direction of arrows 205 in FIG. 23. The central connecting rod 204 and the support angle bars 117 are connected together by rods 161. The rods 161 are pivotally connected, each at one end thereof, to the support angle or double pivot linkage bars 117 substantially in the intermediate portions thereof. The other ends of the rods 161 are pivotally connected to the central connecting rod 204 at positions spaced a predetermined distance from the middle of said rod 204 on opposite sides thereof. Preferably, universal joint type connectors 162 are applied to the connections between the rods 161 and the central connecting rod 204.

In this arrangement, when the support angle bars 117 are turned each around the axis of a pivot pin 118, it is seen that in the early stage of the turning, the rear legs 112 are acted upon to move toward the front legs 107. In the final stage of this turning of the support angle bars 117 attended with this movement of the rear legs 112, the rods 161 project the central connecting rod 204 to fold the latter in the direction of arrows 205. In the reverse movement, similarly, the support or double pivot linkage bars 117 and the central connecting rod 204 are operatively associated by the action of the rods 161. Only the characteristic movements produced in the folding of the baby carriage shown in FIGS. 22 through 24 will be singled out and described below.

In the course from the opened state to the closed state, the support angle or double pivot linkage bars 117 are turned in the direction of arrows 129. In the early stage of this turning of the support angle or double pivot linkage bars 117, they act to move the rear legs 112 toward the front legs 107 without folding the central connecting rod. The connecting rod 204 can be folded only in one direction, since the rods 161 exert a backwardly pulling force. At the end of the turning of the support angle or double pivot linkage bars 117 in the direction of arrow 129, the rear legs 112 are sufficiently close to the front legs 107 to cause the rods 161 to project the central connecting rod 204 and fold the latter in the direction of arrows 205. Finally, as shown in FIG. 24, the rods 161 fold the central connecting rod 204 so that the latter projects upper left, as seen in the figure, in the direction of the length of the operative connecting rods 120. The front legs 107 are arranged substantially parallel to the pusher main bodies 104 and the rear legs 112 are arranged substantially parallel to the pusher main bodies 104, with the right and left members moving toward each other and all the structural elements oriented generally vertically over the base of adjacent wheels 118 and 116.

In the course from the closed state to the opened state, the rear legs 112 are turned away from the front legs 107 and the rods 161 pull central connecting rod 204 backwardly so as to straighten the same. At the end of such movement, the opened state shown in FIG. 22 is established.

FIG. 25 is a perspective view of another embodiment of the invention, shown in the opened state. FIG. 26 is a view, illustrating the arrangement which is characteristic of this embodiment, said view being taken from below the operative connection between the rear legs 112 and the central connecting rod 204. FIG. 27 is a side view of the baby carriage of FIG. 25 in its closed state.

The baby carriage shown in FIGS. 25 through 27 include components common with the baby carriages of FIGS. 7 and 8. Accordingly, the components corresponding to those included in this baby carriage are given like reference numerals.

More particularly, the pusher member 101, front legs 107, rear legs 112, folding operative connecting rods 120 and cross rods are of substantially the same arrangement and connected in substantially the same manner as those shown in FIG. 7. The central connecting rod 204 is the same in arrangement and in the manner of connection as that shown in FIG. 8. A front leg connecting rod 145 provided for the purpose of reinforcement and extending between the right and left front legs 107 is formed with a foldable portion defined by a connector 147 so that it can be folded only in the direction of arrows 146, as shown in FIG. 25.

The arrangement which is characteristic of this embodiment is shown in FIG. 26. Referring to FIG. 26, the lower portions of the rear legs 112 and the central connecting rod 204 are connected together by rods 170. The rods 170, the number of which is two, are put together in the form of the letter X. The connections between such rods 170 and the rear legs 112 have universal joint type connectors 171 applied thereto. Further, the connections between the rods 170 and the central connecting rod 204 have universal joint type connectors 172 applied thereto. The positions of the connections between the rods 170 and the central connecting rod 204 are spaced a predetermined distance from the foldable portion at the middle of the central connecting rod 204 as shown in FIG. 26 on opposite sides thereof and diametrically opposed to the rear legs to which the associated rods 170 are connected.

With the arrangement made as shown in FIG. 26, when the rear legs 112 are turned toward the front legs 107, the rods 170 push out the central connecting rod 204 to fold the latter in the direction of arrows 205, and in the reverse operation, too, the movement of the rear legs 112 is operatively associated with the movement of the central connecting rod 204. The seat of an unillustrated hammock will be positioned on the central connecting rod 204. Therefore, the loads, such as the weight of the baby, on the baby carriage are supported by the central connecting rod 204. In this sense, the rods 170 advantageously serve not only to support said loads but also to establish the opened state of the baby carriage. Only the characteristic movements produced during the folding of the baby carriage shown in FIGS. 25 through 27 will be singled out and described below.

In the course from the opened state to the closed state, the rear legs 112 are turned toward the front legs 107. In response thereto, the rods 170 are actuated to fold the central connecting rod 204 in the direction of arrows 205. At the same time, the width of the baby carriage is decreased. In response to this decrease in width, the right and left front legs 107 move toward each other and the front leg connecting rod 145 is folded in the direction of arrows 146. In addition, the front leg connecting rod 145 is so arranged that it is necessarily folded in the direction of arrows 146 whenever the pair of front legs 107 move toward each other. Such movement proceeds until the closed state as shown in FIG. 27 is finally established.

In the course from the closed state to the opened state, the rear legs 112 are turned away from the front legs 107, and the rods 170 draw the central connecting rod 204 rearwardly to straighten it. The width is increased, with the front leg connecting rod 145 straightened. At the end of such movement, the opened state shown in FIGS. 25 and 26 is established.

The baby carriages according to the various embodiments of the invention described above have all been arranged so that they are descreased also in the width during the folding operation. However, the invention is not limited to such arrangement and also includes the following embodiment. In the embodiment to be described below, the width remains constant throughout the folding operation. In this sense, this embodiment may be understood to clearly represent the most fundamental principle of the invention.

FIG. 28 is a perspective view of an embodiment of the invention, shown in the unfolded or opened state. FIG. 29 is a side view of FIG. 28. FIG. 30 is a side view of the baby carriage of FIGS. 28 and 29, shown in the closed state.

Referring mainly to the figures showing the opened state, the arrangement of the baby carriage shown therein will now be described.

A pusher member 1 adapted to be manually pushed by the person who operates the baby carriage is inverted U-shaped as a whole, with the upper horizontal portion at the upper end thereof forming a grip portion 2. The substantially vertically extending portions or pusher arms of the pusher member 1 form slide or sleeve guide rods 3. The slide guide rods 3 each have a slider or sleeve 4 slidably mounted thereon. Each slider 4 has the upper end of a front leg 6 pivotally connected thereto by a pivot pin 5. The right and left front legs 16 are connected together by the front leg connecting rod 7 for the purpose of reinforcement. By utilizing this front leg connecting rod 7, an unillustrated foot rest may be formed thereon so that the feet of the baby placed in the baby carriage may be rested thereon. Front wheel 8 which are rotatable are mounted on the lower ends of the front legs 6. Rear legs 9 are turnably or pivotally connected to the front legs 6 in the intermediate portions thereof. In this embodiment, the rear legs 9 are pivotally connected by pivot pins 12 to connectors 11 which are attached to lateral sides of the front legs 6. As shown in FIGS. 28 to 30 the connectors 11 comprise double pivot linkages with pivot pin couplings on either side. The right and left rear legs 9 are connected together by a rear leg connecting rod 13 for the purpose of reinforcement. Rear wheels 14 are rotatably mounted on the lower ends of the rear legs 9. Support angle bars 15 are turnably or pivotally connected, each at one end thereof, to the rear legs 9 in the intermediate portions thereof by pivot pins 16. The other ends of the support angle bars 15 have the lower ends of the pusher member 1 turnably connected thereto by pivot pins 17. Thus, the support angle bars 15 comprise elongate double pivot linkage bars with pivot pin couplings at each end. The pivot pins 10, which attach the connectors 11 to the front legs 6, as described above, also turnably or pivotally connect folding operative connecting rods 18 thereto. The rear ends of the operative connecting rods 18 are pivotally connected to the pusher member 1 by pivot pins 19.

In the arrangement described above, the folding operation will now be described with reference to FIGS. 28 through 30.

In the opened state of the baby carriage, the support angle bars 15 have been turned upwardly relative to the pivot pins 16, by which they are connected to the rear legs 9, so that the pusher member 1 has been brought to a relatively higher position. In this condition, the lower portion of the pusher member 1, the upper portion of each rear leg 9 and the rear portion of each folding operative connecting rod 18 cooperate with each other to define a triangle, thereby establishing the opened state. In this situation, if the sliders 4 are locked so as not to slide relative to the slide guide rods 3, the opened state will be maintained. Therefore, it is preferable, though not shown, that locking means for selectively inhibiting the sliders 4 from sliding relative to the slide guide rods 3 is provided in connection with the sliders 4.

When it is desired to change the baby carriage from the opened state described above to its closed state, first the sliders 4 are rendered slidable relative to the slide guide rods 3. Next, the pusher member 1 is somewhat lifted until the support angle bars 15 are aligned with the pusher bar 1, whereupon the pusher member 1 is depressed, with the rear wheel 14 maintained in contact with the ground. In response thereto, the support angle bars 15 are turned downwardly and the pusher member 1 is brought to a lower position while producing relative sliding movement between the sliders 4 and the slide guide rods 3.

In response thereto, the folding operative connecting rods 18 are tilted with their front ends pointing upwardly, with the front legs 6 arranged substantially parallel to the pusher arms 3 of the pusher member 1, and with the rear legs 9 arranged substantially in parallel to the pusher arm 3 of pusher member 1. In this condition, if the sliders 4 are inhibited by the unillustrated locking means from sliding relative to the pusher arms or slide guide rods 3, the closed state is maintained, as shown in FIG. 30. In the state shown in FIG. 30, the two front wheels 8 and the two rear wheels 14 have come together adjacent to each other on the same level to form a base or pedestal and the baby carriage is capable of standing by itself as a vertically oriented assembly of generally parallel collapsed elements.

When it is desired to change the baby carriage from the closed state to the opened state, the operator cancels the locking between the slide guide rods 3 and the sliders 4 and then holding the pusher member 1 by hand, he lifts the entire baby carriage. In response thereto, the weight of the baby carriage comes to act such that the support angle bars 15 are turned downwardly around the axes of the pivot pins 17 at the lower end of the pusher member 1 and at the same time, in response to the downward slide of the sliders 4 on the slide guide rods 3, the folding operative connecting rods 18 are turned to assume a substantially horizontal position. In response thereto, the front legs 6 are turned away from the pusher member 1, and at the same time, the rear legs 9, accompanying the movement of the pusher member 1, are turned away from the front legs 6 by the support angle bars 15. At the end of such series of movements, the opened state shown in FIGS. 28 and 29 is established.

In addition, the present invention has its subject matter directed to the folding mechanism for baby carriages, and an illustration of the hammock for resting the baby therein is omitted. However, the hammock can be advantageously installed by utilizing the pusher member 101 or 1 and the folding operative connecting rods 120 or 18.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A collapsible infant carrier comprising: a pusher member (101, 1) having a pair of substantially vertically extending slide guide rods (104, 3), a pair of sliders (105, 4) which are slidable on said slide guide rods (104, 3), a pair of front legs (107, 6) turnably connected at their upper ends to said sliders (105, 4) to form a pivotal coupling, said pair of front legs having a pair of front wheels connected to the respective lower ends of said pair of front legs, a pair of rear legs (112, 9) turnably connected to said front legs (107, 6) in the intermediate portions thereof to form a pivotal coupling, said pair of rear legs having a pair of rear wheels connected to the respective lower ends of the pair of rear legs, a pair of support angle bars (117, 15) turnably connected at one of their respective ends to said rear legs (112, 9) in the intermediate portions thereof to form a pivotal coupling and at the other ends thereof to the lower end of said pusher member (101, 1) to form a further pivotal coupling; a pair of folding operative connecting rods (120, 18) which are turnably connected to the intermediate portions of said front legs (107, 6) to form a third pivotal coupling and turnably connected to the pusher member (101, 1) at positions spaced a predetermined distance from the lower end of the pusher member to form a fourth pivotal coupling, and width defining connecting rod means for defining the widthwise measured dimension between one side of the carrier defined by one of said slide guide rods, one of said front legs, and one of said rear legs, and the other side of the carrier defined by the other slide guide rod, the other front leg and the other rear leg, whereby the carrier is collapsible in the front to back direction between an opened state and a closed state by the sliding action of the sliders (105, 4) on the pusher member slide guide rods (104, 3) and by the turning action of the respective pivotal couplings including the turning of the support angle bars (117, 15) relative to both the rear legs (112, 9) and the pusher member (101, 1) simultaneously, so that the front wheels and rear wheels are brought together in the front to back direction to form a stable pedestal wheel base and so that the pusher member (101, 1), slide guide rods (104, 3), pair of front legs (107, 6), pair of rear legs (112, 9), and folding operative connecting rods (120, 18) are collapsed to generally vertical orientation in adjacent relationship to form a collapsed generally vertical assembly centered and supported over the stable pedestal wheel base when the carrier is collapsed to the closed state.

2. The carrier of claim 1, wherein said width defining connecting rod means has a given length defining a fixed value of width for the carrier.

3. The carrier of claim 2, wherein said width defining connecting rod means comprises a slide guide rod grip portion connecting rod (2) which connects said pair of slide guide rods (3), a front leg connecting rod (7) which connects said pair of front legs (6), and a rear leg connecting rod (13) which connects said pair of rear legs (9).

4. The carrier of claim 1, wherein said width defining connecting rod means comprises collapsible connecting rod means for defining at least two values of width for the carrier, i.e., a relatively long width and a relatively short width, whereby said carrier is collapsible in the width dimension between said long width and said short width.

5. The carrier of claim 4, wherein said width defining connecting rod means comprises a pair of cross rods which are operatively connected at their upper ends to said sliders and at their lower ends to relatively lower portions of said rear legs reversely disposed and which cross rods cross each other in the form of the letter X.

6. The carrier of claim 5, wherein said width defining connecting rod means further comprises a front leg connecting rod which is foldably connected to relatively lower portions of said pair of front legs.

7. The carrier of claim 6, wherein said folding operative connecting rods each have a front end portion further extending forwardly of said front leg, said carrier further comprising a prop (122) operatively connected between said front leg connecting rod and the front end portion of at least one of said folding operative connecting rods.

8. The carrier of claim 5, further comprising operating rod means (142) for fixing the angle of said pair of cross rods in an open position so as to fix the opened state of the carrier.

9. The carrier of claim 5, wherein said width defining connecting rod means comprises grip means (102) operatively connected between the upper ends of said pair of slide guide rods.

10. The carrier of claim 9, wherein said grip means (102) is foldable and further comprising means for inhibiting the folding of said grip means (102), so as to fix the opened state of the carrier.

11. The carrier of claim 4, wherein said width defining connecting rod means comprises: a pair of second sliders which are slidable on the lower portions of said front legs to form a second sliding coupling, a front leg connecting rod operatively connected at opposite ends thereof to said second sliders and arranged to be foldable downwardly, a pair of turnable arms extending inwardly from said front legs and turnably connected at the front ends thereof to said front leg connecting rod at positions spaced a predetermined distance from the opposite ends thereof, and a pair of bar links connected between said second sliders and said folding operative connecting rods at portions thereof disposed further forwardly of the connection of each folding operative connecting rod to the associated front leg.

12. The carrier of claim 4, wherein said width defining connecting rod means comprises a rear leg connecting rod (202) which is turnably connected at opposite ends thereof to said rear legs (112) and which is downwardly foldable at the intermediate portion thereof, said carrier further comprising tie rods (231) which operatively connect said support angle bars (117) to said rear leg connecting rod (202), whereby said rear leg connecting rod is folded when said support angle bars are turned in two directions.

13. The carrier of claim 12, wherein said rear leg connecting rod (202) is hinged at its center and pivotally connected at the opposite ends thereof to said rear legs (112), so that it is foldable only downwardly.

14. The carrier of claim 12, wherein the positions where said tie rods (231) are connected to said rear leg connecting rod (202) are spaced a predetermined distance from the middle of said rear leg connecting rod (202) on opposite sides of said middle.

15. The carrier of claim 4, wherein said width defining connecting rod means comprises a front leg connecting rod (151) turnably connected at opposite ends thereof to said front legs (107) constructed and arranged to be forwardly foldable at the intermediate portion thereof, said baby carriage further comprising tie rods (153) for operatively connecting said support angle bars (117) to said front leg connecting rod (151), whereby said front leg connecting rod is foldable in operative association with the turning of said support angle bars (117).

16. The carrier of claim 15, wherein said tie rods (153) are connected to said front leg connecting rod (151) at a predetermined distance from the middle of said front leg connecting rod (151) on opposite sides thereof.

17. The carrier of claim 4, wherein said width defining connecting rod means comprises a central connecting rod (204) turnably connected at opposite ends thereof to said folding operative connecting rods (120) and substantially forwardly foldable at the middle thereof, said carrier further comprising tie rods (161) which operatively connect said support angle bars (117) to said central connecting rod (204), whereby said central connecting rod (204) is foldable in operative association with the turning of said support angle bars (117).

18. The carrier of claim 17, wherein said tie rods (161) are connected to said central connecting rod (204) a predetermined distance from the middle of the central connecting rod on opposite sides thereof.

19. The carrier of claim 4, wherein said width defining connecting rod means comprises a central connecting rod (204) turnably connected at opposite ends thereof to said folding operative connecting rods (120) and substantially forwardly foldable at the middle thereof, said carrier further comprising tie rods (170) which operatively connect the lower portions of the rear legs (112) to said central connecting rod (204) such that said tie rods (170) cross each other in the form of the letter X, the positions where said tie rods (170) are connected to the central connecting rod (120) being spaced a predetermined distance from the foldable portion of the central connecting rod on opposite sides thereof.

20. The carrier of claim 4, wherein said width defining means includes a central connecting rod (204) turnably connected at opposite ends thereof to said folding operative connecting rods (120) and substantially forwardly foldable at the intermediate portion thereof and a rear leg connecting rod (202) turnably connected at opposite ends thereof to said rear legs (112) and substantially downwardly foldable at the intermediate portion thereof, said carrier further comprising tie rods (215) connected between said central connecting rod (204) and said rear leg connecting rod (202).

21. The carrier of claim 1, wherein the pivotal coupling of said rear legs and front legs and the pivotal coupling of said folding operative connecting rods and front legs together comprise double pivot connectors (114, 11) whereby said double pivot connectors and said support angle bars (117, 15) afford first and second double pivot linkages of the pair of front legs, pair of rear legs, and pusher member relative to each other for folding and collapsing together.

* * * * *

UNITED STATES PATENT AND TRADEMARK OFFICE
CERTIFICATE OF CORRECTION

PATENT NO. : 4,386,790

DATED : June 7, 1983

INVENTOR(S) : Kenzou Kassai

It is certified that error appears in the above-identified patent and that said Letters Patent is hereby corrected as shown below:

On the title page add:

The foreign priority data are as follows:

```
--[30]          Foreign Application Priority Data
     Mar. 10, 1980 [JP]......................55-30800
     Mar. 10, 1980 [JP]......................55-30801
     Mar. 14, 1980 [JP]......................55-33158--.
```

Signed and Sealed this

Twenty-first Day of August 1984

[SEAL]

Attest:

Attesting Officer

GERALD J. MOSSINGHOFF

Commissioner of Patents and Trademarks